United States Patent Office 2,840,527
Patented June 24, 1958

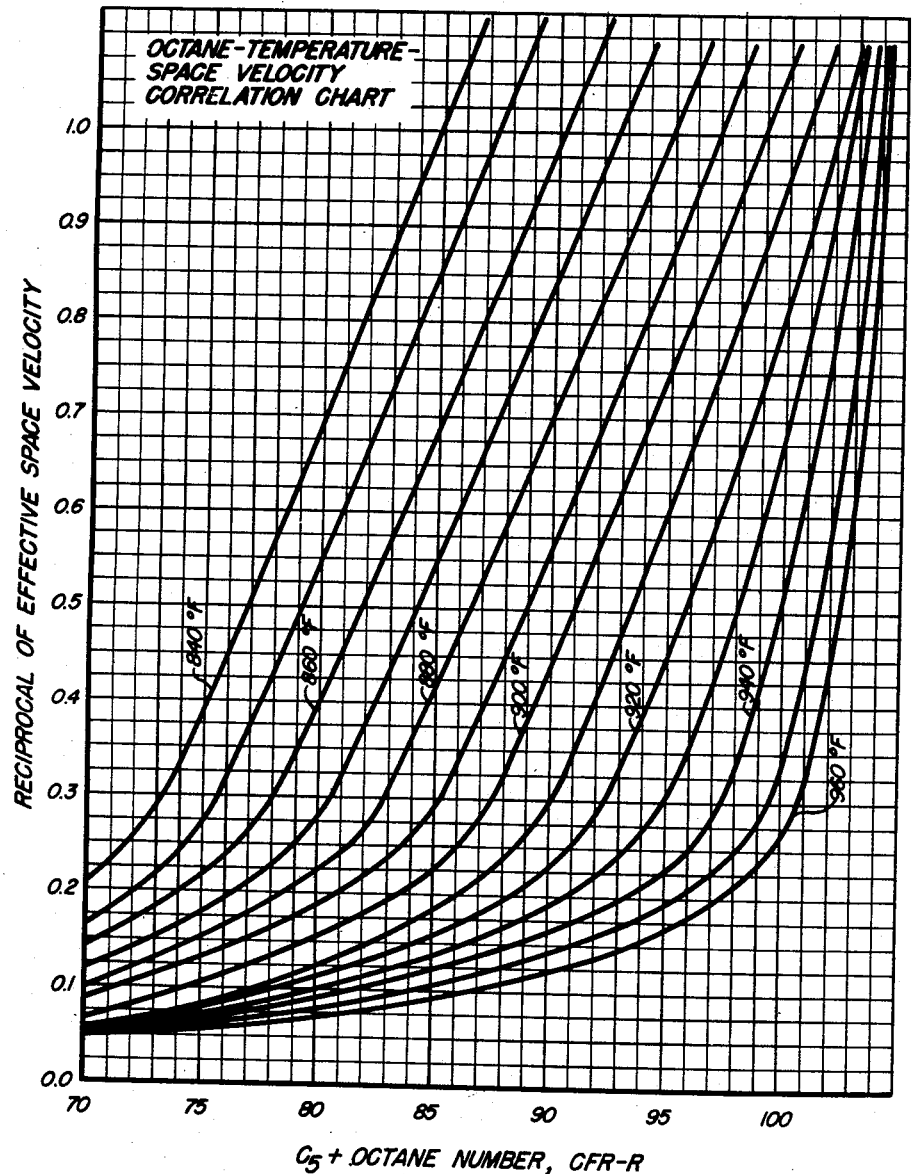

2,840,527

PROMOTED PLATINUM-ALUMINA CATALYSTS

Harry M. Brennan, Hammond, Herman S. Seelig, Valparaiso, and Roy W. Vander Haar, Highland, Ind., assignors to Standard Oil Company, Chicago, Ill., a corporation of Indiana Application March 29, 1955, Serial No. 497,751

10 Claims. (Cl. 252—438)

Our invention relates to the hydroforming of hydrocarbons. More particularly, it relates to an improved catalyst for the hydroforming of hydrocarbons and to a method for the preparation thereof.

Within recent years, a continuing demand for motor fuels of improved octane rating has brought about a number of important changes in the technology of petroleum refining. Among the more important developments has been an improved hydroforming process, employing a catalyst which consists essentially of a small proportion of platinum deposited upon an alumina support. A catalyst of this type, containing 0.6 percent by weight of platinum, based on dry $Al_2O_3$, is ordinarily employed at a temperature between about 850 and 1000° F., a pressure between about 50 and 1,000 pounds per square inch gage, a charging-stock hourly weight space velocity between about 0.5 and 10, and a hydrogen rate of about 2,000 to 10,000 standard cubic feet per barrel of charging stock. Under these conditions, the catalyst is initially capable of upgrading a 50 CFR–R octane number naphthenic naphtha into a stabilized 10-pound Reid 400° F. end-point gasoline of 90 CFR–R octane number or better in a yield of 90 percent by volume. This represents a remarkable advance over the processes and catalysts of the prior art, as exemplified by processes employing molybdena-alumina, chromia-alumina, and the like.

A major disadvantage of platinum as a catalytic material lies in its high cost. Its use is economically feasible in the conversion of petroleum stocks only because it can be dispersed in low concentration on carriers of relatively low cost, such as alumina. It will be apparent that any means for improving the activity of such catalysts per unit of platinum contained therein would represent an important advance in the art. It is accordingly an object of our invention to increase the catalytic activity of platinum-alumina catalysts. Another object is to improve the hydroforming activity of platinum-alumina catalysts, calculated in terms of their platinum content. These and other objects will be apparent from the following description.

We have now discovered that platinum-alumina composites can be greatly improved in catalytic activity by incorporating an inorganic aluminum salt therein, such as aluminum chloride, suitably in a ratio between about 0.001 and 0.02 mole per mole of anhydrous $Al_2O_3$. In a simple embodiment of our invention, a catalyst of the platinum-alumina type is impregnated with a solution of such a salt, adapted to wet the surfaces of the catalyst while avoiding any depletive washing action on the platinum contained therein, and the catalyst is dried and calcined under conventional conditions. In another embodiment, the catalyst is exposed to contact with vapors of a volatile, inorganic aluminum salt.

Our invention can be employed successfully for treating the broad class of alumina-supported platinum catalysts. The alumina support is a hydrous solid, preferably eta-alumina or gamma-alumina, derived from alumina hydrosol, alumina hydrogel, alumina xerogel, alumina monohydrate, sintered alumina, or the like, all of which can be prepared according to methods described in the prior art. Into the alumina may be incorporated additional promoting components if desired, such as chloride, fluoride,, silica, boria, chromia, an oxide of phosphorus, or the like, suitably in a proportion below about 0.1 and 8 percent by weight, based on dry $Al_2O_3$. The alumina support should be substantially freed from soluble salts and other undesirable impurities by washing. The platinum can be added to the alumina in the form of a platinum compound such as chloroplatinic acid, platinum tetrachloride, or the like, or a solution thereof, or preferably a stable colloidal suspension or solution of a platinum sulfide, and the proportion of platinum in the completed catalyst should be between about 0.05 and 1 percent by weight of the alumina on a dry basis. The catalyst can be prepared in any desired mechanical form according to the specific process and equipment for which it is intended.

In a preferred embodiment, our invention can be practiced in the following manner. A platinum-alumina catalyst is prepared in a conventional manner by commingling a platinum solution with alumina, drying, and calcining at temperatures of about 400 to 1300° F., preferably about 800 to 1200° F., for a period of 1 to 24 hours or longer, sufficient to reduce the water content of the catalyst to between about 1 and 30 percent by weight, anhydrous basis. The catalyst is then treated at ordinary or slightly elevated temperature with a small amount of inorganic aluminum salt dissolved in a suitable solvent. Excess solution may be removed from the catalyst if desired by draining and/or washing with a limited quantity of fresh solvent (e. g., 25 to 50 percent by weight thereof). The catalyst is thereafter dried for 1 to 24 hours at 200 to 400° F., and calcined for 1 to 12 hours at 800 to 1200° F.

The activating agent employed in the preferred form of our invention is a solution of an inorganic aluminum salt having substantially no solvency for platinum in platinum-alumina composites—i. e., a salt solution which dissolves less than about 1 percent of the platinum contained in a conventional 0.6 percent platinum-on-alumina catalyst on prolonged contact in 2:1 volume ratio with said catalyst at ordinary temperatures. Suitable aluminum salts include the nitrate, the sulfate, and other inorganic aluminum salts which can be dissolved without decomposition and without metathetical reaction with the solvent. We prefer to use the soluble halides, such as the bromide or iodide, or optimally the chloride. A hydrate of the chosen salt may be used where the water of hydration does not cause undesirable side reactions or render the salt insoluble in the chosen solvent. We prefer to use water as the solvent, and to use salts which can be dissolved therein without separation of hydrous alumina. Other suitable solvents include hydrocarbons such as benzene, toluene, xylene, cyclohexane, methylcyclohexane, n-butane, isobutane, n-octane, isooctane, and petroleum naphthas, halogenated hydrocarbons such as chloroform, carbon tetrachloride, and ethylene dibromide, ethers such as diethyl ether and dibutyl ether, alcohols such as methanol, ethanol, and isopropyl alcohol, ketones such as acetone and methyl ethyl ketone, and the like. Mixtures of the foregoing solvents can be employed, if desired, especially in connection with relatively insoluble salts, and the solutions may also include wetting agents such as sodium benzenesulfonate, a polyethylene glycol, a glycol ether, or the like. The concentration of added solvents or wetting agents may range up to the saturation point or to the point of incompatibility.

Our process is capable of producing some degree of activation of platinum-alumina catalysts even when very small quantities of aluminum salt are added to the catalyst. It is desirable, however, to employ the aluminum salt in a molar ratio to the alumina of at least about 0.001:1, anhydrous basis, and we find that the incremental activating effect of the aluminum salt falls off rapidly at molar ratios above about 0.02:1. In a preferred form of our invention, we employ aluminum chloride in the range of about 0.1 to 3 percent by weight of $AlCl_3$, based on dry $Al_2O_3$, and we have obtained best results in terms of catalyst promotion and aluminum salt utilization at proportions between about 0.2 and 2 percent by weight of $AlCl_3$.

When our activating salt is used in the form of a solution, the concentration thereof may suitably range upward from about 0.01 M, the exact concentration employed being determined by the quantity of aluminum salt and the volume of solution to be added to the catalyst. It is convenient to employ only a sufficient quantity of the solution to saturate the catalyst particles and to wet the surfaces of the catalyst. For this purpose, between about 75 and 80 grams of solution per 100 grams of catalyst particles are ordinarily sufficient, and salt concentrations between about 0.01 M and 0.3 M are advantageously employed.

The treatment of catalysts with an aluminum salt solution according to our invention is effective in some degree over a wide range of temperatures at, above, and below ordinary temperatures. Catalyst penetration is, of course, favored at somewhat elevated temperatures, for example between about 150 and 220° F. The duration of exposure of the catalyst to the salt solution prior to drying and calcination may range from 0.1 hour up to 48 hours or more. In an advantageous embodiment, the catalyst is soaked in the aluminum salt solution at the reflux temperature of the solvent for 0.25 to 6 hours, optimally around 1 hour.

In the vapor-phase treatment of platinum-alumina catalysts according to our invention, the catalyst is exposed to contact with a volatile inorganic aluminum compound such as aluminum chloride, aluminum bromide, or aluminum iodide in the vapor phase at a temperature high enough to effect vaporization thereof and below about 1050° F., suitably above about 350° F., and preferably between about 400 and 950° F. A treating time of around 0.25 to 12 hours under these conditions is ordinarily sufficient to effect a marked promotion of the catalyst activity, at the end of which time it will generally be found that the catalyst has accumulated or retained between about 0.1 and 3 percent by weight of the aluminum halide or other aluminum salt. The treating step can conveniently be carried out by volatilizing the inorganic aluminum salt and passing the vapors through a bed of the catalyst; or by passing a stream of hydrogen or an inert gas such as nitrogen or methane through or over a bed of anhydrous aluminum chloride (for example) at a temperature above about 350° F., under which conditions the aluminum chloride sublimes and is carried as a vapor by the gas stream into the catalyst bed; or the catalyst particles can be commingled with the volatile inorganic aluminum salt and the mixture thereof heated to a temperature above the vaporization point of the aluminum salt; or the catalyst can be crushed, commingled with volatile inorganic aluminum salt, repelleted, and heated above the said volatilization temperature. Other techniques will be apparent to those skilled in the art.

In designating the activity of a platinum-alumina hydroforming catalyst, it is convenient to employ a relative activity scale, by means of which the catalyst is compared to a standard catalyst operating under certain fixed conditions. For our standard, we have chosen a catalyst composed of pure Heard-type alumina, containing 0.6 percent by weight of platinum uniformly distributed throughout 1/8" x 1/8" cylindrical pills, and the evaluation thereof is carried out at 200 pounds per square inch gage with a once-through hydrogen rate of 5,000 cubic feet per barrel in the hydroforming of a Mid-Continent virgin naphtha having an ASTM boiling range of 200 to 360° F., a CFR-R octane number of 44, a sulfur content (lamp) of 0.03 percent, an API gravity of 56.5, a bromine number of 1.4, a Reid vapor pressure of 1.8 pounds per square inch, and a content of 40 percent naphthenes, 52 percent paraffins, and 8 percent aromatics. When the standard catalyst is employed under the foregoing conditions to hydroform the designated charging stock, its activity at any given temperature and space velocity, as measured by the CFR-R octane number of the $C_5+$ product fraction, is arbitrarily assigned the value of 100.

In setting up the standard of activity, the standard catalyst was first subjected to a series of hydroforming tests over a range of catalyst temperatures and space velocities in a quasi-isothermal laboratory reactory comprising a tubular reaction vessel holding 50 milliliters of catalyst, surrounded by an electrically heated metal block for temperature control, and the CFR-R octane number of the $C_5+$ product fraction from each set of conditions was determined. Since the hydroforming reactions are predominantly endothermic in nature, the catalyst exit temperature is always lower than the catalyst inlet temperature, but the extent of the difference is variable, depending upon the space velocity, the activity of the catalyst (in the case of catalysts other than the standard), and other factors. This variability, we found, could be eliminated by correcting the observed $C_5+$ product fraction octane numbers, the correction being made by subtracting 0.075 octane number per ° F. of temperature difference. The corrected octane numbers were then plotted against the reciprocal of the space velocity as a family of curves with the catalyst exit temperature as the parameter, giving the attached reference graph for use in computing the relative activity of other catalysts.

In measuring the relative activity of a catalyst, it is subjected to a hydroforming test under conditions approximating the standard conditions set forth above. During the test, the average catalyst inlet temperature, the average catalyst exit temperature, and the average space velocity are observed, and the reaction product is collected for determination of the CFR-R octane number of the $C_5+$ fraction thereof. The said product fraction octane number is corrected as described above for the catalyst temperature gradient, and the corrected octane number is then employed in conjunction with the appended reference curves to determine the reciprocal of the equivalent liquid volume space velocity which would be required by the standard catalyst at the same catalyst exit temperature to produce the same product quality. The corresponding space velocity may be termed the "effective liquid volume space velocity" of the catalyst under test, as contrasted with the actual space velocity. Finally, the said reciprocal of the effective liquid volume space velocity is multiplied by the actual liquid volume space velocity (volume of charging stock per volume of catalyst per hour) used in the test, and the quotient is multiplied by 100. The result is the measured activity of the catalyst, relative to the standard catalyst. The said measured activity is the number of volumes of standard catalyst that would be required to accomplish the same result as 100 volumes of the catalyst under test.

Our invention will be more fully understood from the following specific examples.

*Example 1*

A 75-milliliter portion of chloroplatinic acid solution containing 8 grams of platinum per liter was diluted to 400 milliliters with water and added to 2,070 grams of a Heard-type alumina hydrosol containing 4.84 percent by weight of $Al_2O_3$. The resulting mixture was dried overnight at 250° F. and calcined 3 hours at 950° F. The dry cake was then ground, mixed with 4 percent of Sterotex and 2.75 grams of $AlCl_3.6H_2O$ (1.5 percent by weight AlCl₃ on Al₂O₃, dry basis), formed into ⅛-inch pills, and calcined 6 hours at 1100° F. The completed catalyst, containing 0.28 percent by weight Pt and 0.68 percent Cl, was subjected to a hydroforming test on a Mid-Continent virgin naphtha having the following inspections:

Boiling range, ASTM:
- Initial ............................................. °F.. 200
- 10% ............................................... °F.. 237
- 50 ................................................. °F.. 272
- 90 ................................................. °F.. 313
- End point ..................................... °F.. 360

Octane number, CFR-R ........................... 44
Sulfur content (lamp) .................. percent.. 0.03
Gravity, API ........................................... 56.5
Reid vapor pressure .................. p. s. i.. 1.8
Bromine number ..................................... 1.4
Composition:
- Naphthenes ........................ percent.. 40
- Paraffins .............................. do.... 52
- Aromatics ............................. do.... 8

A quasi-isothermal laboratory reactor was employed for the test, comprising a tubular reaction vessel holding 50 milliliters of catalyst, surrounded by an electrically heated metal block for temperature control. The block was maintained at a temperature of approximately 935° F., and the hydroforming reaction was carried out at a pressure of 200 pounds per square inch gage, a liquid hourly space velocity of 4, and a once-through hydrogen rate of 5,000 cubic feet per barrel of feed. Under these conditions, the reaction products emerging from the catalyst zone had an average temperature of about 920° F. The products were collected at intervals and tested, with the results given in the table below.

| Product Interval | Octane No., CFR-R | Measured Activity | Adjusted Activity |
|---|---|---|---|
| 0-20 | 94.8 | 134 | 287 |
| 20-40 | 91.5 | | |
| 40-60 | 90.0 | | |
| 60-80 | 89.4 | 82 | 176 |
| 80-100 | 88.9 | | |
| 100-120 | 87.0 | 70 | 150 |
| 120-140 | 87.6 | | |
| 140-160 | 86.9 | 67 | 144 |

In the above table, the "adjusted activity" is the measured (relative) activity multiplied by the ratio of the platinum contents in the standard catalyst and in the catalyst undergoing test. The adjusted activity is thus a measure of the activity of the catalyst in terms of unit weight of platinum. This is an important factor in the evaluation of platinum catalysts, since platinum is so expensive a material that it may constitute a large part of the capital investment in a hydroforming unit in which it is used. From the results of the comparative tests reported in the above table, it is apparent that our new type of catalyst exhibits an adjusted activity of a different order of magnitude compared with the prior-art catalysts.

Example 2

A sulfided, cogelled catalyst containing 0.3 percent by weight platinum on alumina was prepared by commingling aqueous chloroplatinic acid solution with aqueous ammonium polysulfide, commingling the resulting platinum solution with a Heard-type alumina hydrosol, gelling, drying, calcining, grinding, pilling, and recalcining. One hundred grams of the finished ⅛-inch pills were then treated with 75 milliliters of an aqueous solution containing 2 grams of AlCl₃·6H₂O (1.1 percent by weight of AlCl₃ on Al₂O₃, dry basis). The treated pills were dried overnight at 220° F., then calcined 6 hours at 1100° F. The completed catalyst, containing 0.30 percent by weight platinum and 0.85 percent Cl, was subjected to a hydroforming test as described in Example 1. The results were as follows:

| Product Interval | Octane No., CFR-R | Measured Activity | Adjusted Activity |
|---|---|---|---|
| 0-20 | 93.6 | 159 | 318 |
| 20-40 | 92.7 | | |
| 40-60 | 91.8 | | |
| 60-80 | 92.0 | 109 | 218 |
| 80-100 | | | |
| 100-120 | 90.9 | | |
| 120-140 | 90.8 | | |
| 140-160 | 89 | 90 | 180 |

While we have described our invention with reference to certain specific embodiments thereof, it should be understood that such embodiments are illustrative only and not by way of limitation. Various modifications of our invention and alternative operating procedures and conditions will be apparent from the foregoing description to those skilled in the art.

This application is a continuation-in-part of our application Serial No. 379,408, filed September 10, 1953, now abandoned.

In accordance with the foregoing description, we claim as our invention:

1. A method of preparing an alumina-based hydroforming catalyst of improved activity, which comprises commingling a platinum compound with alumina in a proportion between about 0.05 and 1 percent by weight of platinum, based on dry Al₂O₃, drying and calcining the resulting mixture to a water content between about 1 and 30 percent by weight, dry basis, introducing into the dried and calcined mixture a single substance selected from the group consisting of aluminum nitrate, aluminum sulfate, aluminum chloride, aluminum bromide, and aluminum iodide in a proportion above about 0.001 mole per mole of dry Al₂O₃, thereafter removing any added solvent, and calcining.

2. In a method for preparing an alumina-based hydroforming catalyst of improved activity, which comprises commingling a platinum compound with alumina in a proportion between about 0.05 and 1 percent by weight of platinum, based on dry Al₂O₃, drying and calcining the resulting mixture to a water content between about 1 and 30 percent by weight, dry basis, the improvement which comprises exposing the platinum-alumina mixture, after the drying and calcining operation, to contact at elevated temperature with vapors of a single salt selected from the group consisting essentially of aluminum chloride, aluminum bromide, and aluminum iodide.

3. In a method for preparing an alumina-based hydroforming catalyst of improved activity, which comprises commingling a platinum compound with alumina in a proportion between about 0.05 and 1 percent by weight of platinum, based on dry Al₂O₃, drying and calcining the resulting mixture to a water content between about 1 and 30 percent by weight, dry basis, the improvement which comprises contacting the platinum-alumina mixture, after the drying and calcining operation, with vapors of aluminum chloride at a temperature between about 350 and 1050° F.

4. A method for preparing a platinum-alumina hydroforming catalyst, which comprises combining alumina with a solution of a platinum compound in a quantity sufficient to incorporate between about 0.05 and 1 percent by weight of platinum therein, based on dry Al₂O₃, drying and calcining the resulting mixture to a water content between about 1 and 30 percent by weight, dry basis, introducing into the dried and calcined mixture a solution of a single inorganic aluminum salt selected from the group consisting essentially of aluminum nitrate, aluminum sulfate, aluminum chloride, aluminum bromide, and aluminum iodide, and thereby drying and calcining.

5. A method for preparing a platinum-alumina hydroforming catalyst, which comprises combining alumina with a solution of a platinum compound in a quantity sufficient to incorporate between about 0.05 and 1 percent by weight of platinum therein, based on dry $Al_2O_3$, drying and calcining the resulting mixture to a water content between about 1 and 30 percent by weight, dry basis, introducing into the dried and calcined mixture a solution of aluminum chloride in a quantity containing said aluminum chloride in a molar ratio to the alumina in said mixture above about 0.001:1, and thereafter drying and calcining.

6. A method for preparing a platinum-alumina hydroforming catalyst, which comprises combining alumina with a solution of a platinum compound in a quantity sufficient to incorporate between about 0.05 and 1 percent by weight of platinum therein, based on dry $Al_2O_3$, drying and calcining the resulting mixture to a water content between about 1 and 30 percent by weight, dry basis, absorbing into the dried and calcined mixture a quantity of a solution of aluminum chloride containing said aluminum chloride in a molar ratio to the alumina in said mixture between about 0.001:1 and 0.02:1, and thereafter drying and calcining.

7. A method for preparing a platinum-alumina hydroforming catalyst, which comprises combining alumina with a solution of a platinum compound in a quantity sufficient to incorporate between about 0.05 and 1 percent by weight of platinum therein, based on dry $Al_2O_3$, drying and calcining the resulting mixture to a water content between about 1 and 30 percent by weight, dry basis, introducing into the dried and calcined mixture an aqueous solution of aluminum nitrate, and thereafter drying and calcining.

8. A method for preparing a platinum-alumina hydroforming catalyst, which comprises combining alumina with a solution of a platinum compound in a quantity sufficient to incorporate between about 0.05 and 1 percent by weight of platinum therein, based on dry $Al_2O_3$, drying and calcining the resulting mixture to a water content between about 1 and 30 percent by weight, dry basis, impregnating the dried and calcined mixture with an aqueous solution of aluminum chloride in a quantity containing aluminum chloride in a proportion between about 0.2 and 2 percent by weight of the alumina in the dried and calcined mixture, anhydrous basis, and thereafter drying and calcining.

9. A method for preparing a platinum-alumina hydroforming catalyst, which comprises combining alumina with a solution of a platinum compound in a quantity sufficient to incorporate between about 0.05 and 1 percent by weight of platinum therein, based on dry $Al_2O_3$, drying and calcining the resulting mixture to a water content between about 1 and 30 percent by weight, dry basis, treating the dried and calcined mixture with a solution of aluminum chloride by adding thereto a sufficient quantity of said solution to substantially saturate the dried and calcined mixture while avoiding any unabsorbed excess of said solution, and drying and calcining.

10. A method for preparing a platinum-alumina hydroforming catalyst, which comprises combining alumina with a solution of a platinum compound in a quantity sufficient to incorporate between about 0.05 and 1 percent by weight of platinum therein, based on dry $Al_2O_3$, drying and calcining the resulting mixture to a water content between about 1 and 30 percent by weight, dry basis, adding to the dried and calcined mixture an aqueous solution of aluminum nitrate in the proportion of about 75 grams of solution per 100 grams of catalyst, whereby substantially the entire amount of the said solution is absorbed in said mixture, and thereafter drying and calcining.

References Cited in the file of this patent

UNITED STATES PATENTS

| | | |
|---|---|---|
| 2,406,646 | Webb et al. | Aug. 27, 1946 |
| 2,479,109 | Haensel | Aug. 16, 1949 |
| 2,635,080 | Appell | Apr. 14, 1953 |